(12) United States Patent
Summerfield et al.

(10) Patent No.: US 11,920,538 B2
(45) Date of Patent: Mar. 5, 2024

(54) ANTI-POLISH RING FOR AN ENGINE CYLINDER

(71) Applicant: Cummins Inc., Columbus, IN (US)

(72) Inventors: Owen Summerfield, Rothwell (GB); Craig Daniel Fox, Leamington Spa (GB); Robert Harries, Daventry (GB); Jamie Kehoe, Northhamptonshire (GB); Kent H. Clark, Milford, MI (US); John M Antonevich, Bemus Point, NY (US); Reid M. Irish, Stockton, NY (US); Scott A. Ragon, Seymour, IN (US); Stephen G. Townsend, Daventry (GB); Peter Thomas Quanz, Sherman, NY (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/052,441

(22) Filed: Nov. 3, 2022

(65) Prior Publication Data

US 2023/0089302 A1 Mar. 23, 2023

Related U.S. Application Data

(63) Continuation of application No. PCT/US2021/032868, filed on May 18, 2021.

(60) Provisional application No. 63/030,489, filed on May 27, 2020.

(51) Int. Cl.
*F02F 1/00* (2006.01)

(52) U.S. Cl.
CPC ........ *F02F 1/004* (2013.01); *F02F 2001/006* (2013.01)

(58) Field of Classification Search
CPC .............................. F02F 2001/006; F16J 10/04
USPC ........................................................ 123/193.2
See application file for complete search history.

(56) References Cited

U.S. PATENT DOCUMENTS

| | | | |
|---|---|---|---|
| 1,804,574 A * | 5/1931 | Victor | F16J 15/123 277/600 |
| 3,081,754 A * | 3/1963 | Georges | F01L 3/22 123/41.85 |
| 3,115,127 A | 12/1963 | Spencer et al. | |
| 3,586,338 A | 6/1971 | Miklau et al. | |

(Continued)

FOREIGN PATENT DOCUMENTS

| | | |
|---|---|---|
| EP | 1061294 B1 | 4/2003 |
| WO | 2004022960 | 3/2004 |
| WO | 2017200714 A1 | 11/2017 |

OTHER PUBLICATIONS

Search Report and Written Opinion, PCT Application Serial No. PCT/US21/032868, dated Aug. 16, 2021, 7 pgs.

*Primary Examiner* — Long T Tran
*Assistant Examiner* — James J Kim
(74) *Attorney, Agent, or Firm* — Taft Stettinius & Hollister LLP

(57) ABSTRACT

An anti-polish ring for an internal combustion engine is provided. The anti-polish ring includes an axially extending ring portion that is configured to scrape a top portion of a piston in a cylinder liner. The anti-polish ring is configured to accommodate passage of an intake or exhaust valve thereby. The anti-polish ring may include an alignment feature so that the anti-polish ring is inserted in a predetermined orientation in the cylinder. The anti-polish ring may include a heat shield and/or a seating member.

19 Claims, 3 Drawing Sheets

(56) References Cited

U.S. PATENT DOCUMENTS

| | | | |
|---|---|---|---|
| 4,449,492 A | 5/1984 | Reynaud | |
| 4,474,147 A * | 10/1984 | Hoopes | F16J 15/0881 |
| | | | 277/601 |
| 4,513,703 A * | 4/1985 | Eckert | F16J 15/0806 |
| | | | 123/669 |
| 4,770,133 A | 9/1988 | Schibalsky | |
| 5,553,585 A | 9/1996 | Paro | |
| 5,954,038 A * | 9/1999 | Warwick | F02F 1/166 |
| | | | 123/668 |
| 6,152,122 A * | 11/2000 | Hampson | F02F 3/285 |
| | | | 123/661 |
| 6,196,179 B1 | 3/2001 | Frantzheld | |
| 6,234,134 B1 | 5/2001 | Bedapudi et al. | |
| 6,367,463 B1 | 4/2002 | Nurmi | |
| 7,438,037 B2 | 10/2008 | Oogake et al. | |
| 7,484,493 B2 | 2/2009 | Bishofberger et al. | |
| 7,677,217 B2 | 3/2010 | Kumar et al. | |
| 8,347,842 B2 | 1/2013 | Sadowski et al. | |
| 8,851,042 B2 | 10/2014 | Imhasly | |
| 9,822,702 B2 | 11/2017 | Watanabe et al. | |
| 10,865,652 B2 * | 12/2020 | Treat | F16J 15/3272 |
| 2003/0067122 A1* | 4/2003 | Hinson | F16J 15/061 |
| | | | 277/593 |
| 2005/0279296 A1* | 12/2005 | Coney | F02F 1/18 |
| | | | 123/193.2 |
| 2007/0107689 A1* | 5/2007 | Oogake | F02F 1/16 |
| | | | 123/193.2 |
| 2009/0241770 A1* | 10/2009 | Blythe | F02B 77/04 |
| | | | 92/260 |
| 2012/0304954 A1* | 12/2012 | Kiser | F02F 1/004 |
| | | | 123/193.2 |
| 2013/0032117 A1 | 2/2013 | Worthington et al. | |
| 2015/0114373 A1* | 4/2015 | Beasley | F02B 23/0603 |
| | | | 123/668 |
| 2016/0097340 A1* | 4/2016 | Morgan | F02F 1/10 |
| | | | 123/193.2 |
| 2017/0002734 A1* | 1/2017 | Watanabe | F02B 77/04 |

* cited by examiner

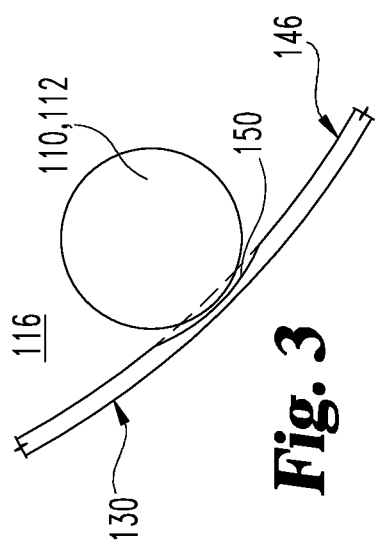
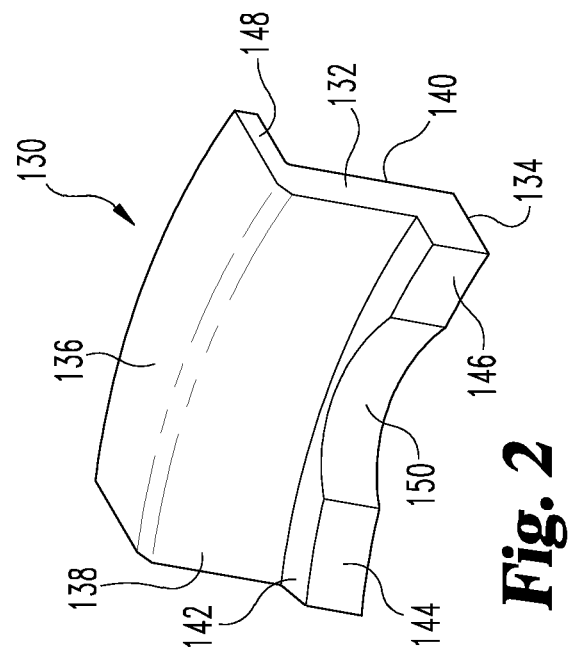
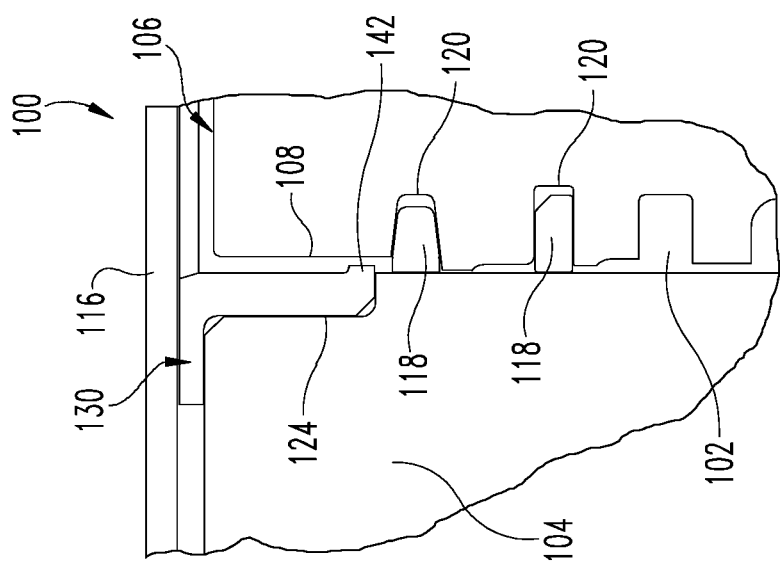

ANTI-POLISH RING FOR AN ENGINE CYLINDER

CROSS-REFERENCE TO RELATED APPLICATIONS

The present application is a continuation of PCT Patent Application No. PCT/US21/32868 filed on May 18, 2021, which claims the benefit of the filing date of U.S. Provisional Application Ser. No. 63/030,489 filed on May 27, 2020, each of which is incorporated herein by reference in its entirety.

BACKGROUND

The present disclosure relates generally to internal combustion engines, and more particularly, but not exclusively, to an internal combustion engine with anti-polish ring(s) in the cylinders.

Generally, anti-polish rings (also commonly referred to as "carbon scraper rings") are configured with a wall or protrusion that protrudes over the cylinder liner surface in order to scrape carbon deposits off a piston in the internal combustion engine. In particular, the anti-polish ring is located with sufficient radial overhang into the cylinder bore to remove hard carbon deposits from the piston top land surface above the piston rings as the piston moves toward and away from top-dead-center in the combustion chamber. This scraping limits the carbon deposit growth formation on the piston top land, and averts the primary cause of liner bore polish and subsequent oil consumption issues. The presence of an anti-polish ring in the combustion chamber also reduces the crevice volume, considered a source of unburned hydrocarbons, and affecting PM and smoke emissions levels.

Engines are continually being developed to meet emission and performance requirements, which involves modifications in the cylinder head internal porting geometry, combustion chamber geometry, the inlet and exhaust valve geometry for in-cylinder air flow, and fuel injection. The geometry of the valves and ports, and the valve lift profiles, are optimized to minimize the pressure drop of the flow across the valves while also maintaining structural integrity. This generally means larger valve sizes are used to allow higher maximum air flows for a given cylinder displacement. This increases volumetric efficiency and helps to fill the cylinder with air faster. However, the space claim within the cylinder taken up by the valve heads and the valves lift profile makes retrospective fitment of an effective anti-polish ring challenging. In addition, the cylinder head is exposed to the in-cylinder combustion, introducing cracking and durability concerns for the cylinder head. Therefore, further improvements in this technology area are needed to address these issues, among others.

SUMMARY

The present disclosure includes a unique apparatus and system including an anti-polish ring. In one embodiment, an apparatus includes an anti-polish ring configured to be inserted into and retained in a first end of a cylinder liner of a reciprocating piston internal combustion engine. The anti-polish ring includes a radially inwardly facing surface configured to accommodate passage of an intake or exhaust valve of the cylinder thereby.

In another embodiment, an apparatus includes an anti-polish ring configured to be inserted into and retained in a substantially stationary relationship with a first end of a cylinder liner of a reciprocating piston internal combustion engine. The anti-polish ring includes at least one feature that interacts with the cylinder head gasket and/or cylinder head to ensure insertion of the anti-polish ring in a predetermined orientation within the cylinder liner.

In another embodiment, an apparatus includes an anti-polish ring configured to be inserted into a first end of a cylinder liner of a reciprocating piston internal combustion engine. The anti-polish ring includes a heat shield at an end thereof that reduces the operating temperature at the firing face portion of the cylinder head.

In another embodiment, an apparatus includes an anti-polish ring configured to be inserted into a first end of a cylinder liner of a reciprocating piston internal combustion engine. The anti-polish ring includes a heat shield at an end thereof and at least one seating member that assists in seating the heat shield against the cylinder head.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like numerals refer to like parts throughout the several views, and wherein:

FIG. 1 is a sectional view of an example embodiment of an engine assembly including an anti-polish ring, according to an implementation of the present disclosure.

FIG. 2 is a partial perspective view of the anti-polish ring of FIG. 1.

FIG. 3 is a partial sectional view of the anti-polish ring of FIG. 1.

DETAILED DESCRIPTION OF ILLUSTRATIVE EMBODIMENTS

Figure 4:
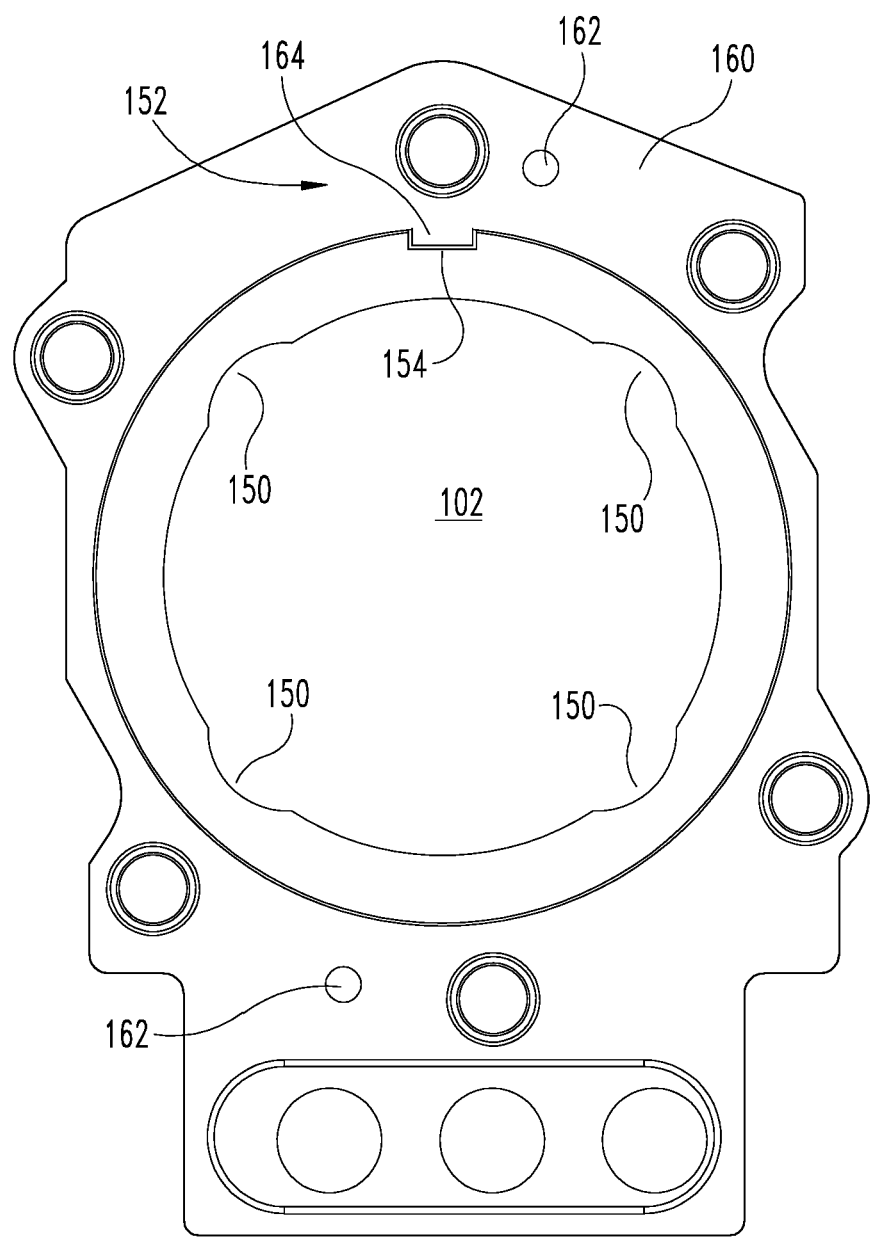
FIG. 4 is a plan view showing the anti-polish ring of FIG. 1 interacting with the head gasket for insertion of the anti-polish ring in a pre-determined orientation in the cylinder liner.

For the purposes of clearly, concisely and exactly describing illustrative embodiments of the present disclosure, the manner and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created, and that the invention includes and protects such alterations, modifications, and further applications of the example embodiments as would occur to one skilled in the art.

The present disclosure relates to an anti-polish ring for scraping carbon from a piston. In certain embodiments, an anti-polish ring may include arrangements on a radially inwardly facing surface that accommodate passage of an intake/exhaust valve therethrough. In certain embodiments, an anti-polish ring may include one or more features to provide insertion of the anti-polish ring in a predetermined orientation in the cylinder liner. In certain embodiments, an anti-polish ring may include a heat shield at one end thereof. In certain embodiments, an anti-polish ring may include one or more members to provide a positive seating of the anti-polish ring with the cylinder head.

With reference to FIG. 1, there is illustrated a sectional view illustrating certain aspects of an example embodiment of an engine assembly 100. The engine assembly 100 includes a cylinder 102 (sometimes referred to as a cylinder bore) formed in an engine block (not shown) and having a cylinder liner 104, a piston 106 disposed inside of the cylinder liner 104 to move in an upward and downward direction inside the cylinder liner 104, and an anti-polish ring 130 provided in an upper portion of the cylinder liner 104. For discussion purposes, only a single cylinder 102 is shown. However, it may be appreciated by those skilled in the art that an engine assembly may include a variety of different numbers and configurations of cylinders forming combustion chambers into which fuel is injected by fuel injectors to combust with charge air that has entered through an intake manifold such that energy released by combustion may power an engine via pistons connected to a crankshaft. Intake valves control the admission of charge air into the cylinders, and exhaust valves control the outflow of exhaust gas through exhaust manifold (not shown) and ultimately to the atmosphere.

An intake valve 110 (FIG. 3) controls the admission of charge air into the cylinder 102, and an exhaust valve 112 (FIG. 3) controls the outflow of exhaust gas out of the cylinder 102. It shall be appreciated that certain embodiment may include more than one intake valve and/or more than one exhaust valve. The piston 106 is connected to crankpin (not shown) that is attached to connecting rod (not shown). The piston 106 may be provided with a number of piston rings 118 which are positioned in grooves 120 provided in the outer diameter of the piston 106. The piston 106 includes an upper portion 108 (sometimes referred to as a top land or top ring of the piston) that positioned axially above the piston rings 118 and is configured to scrape against anti-polish ring 130 when the piston 106 moves in the upward and downward directions. The anti-polish ring 130 is configured to be inserted into a counterbore of and retained in a substantially stationary or fixed relationship with a first end 124 of the cylinder liner 104. In the illustrated embodiment, the anti-polish ring 130 is received in an upper receiving portion defined in the first end 124 of the cylinder liner 104 and retained in a substantially stationary relationship therewith by force applied by cylinder head 116.

With reference to FIG. 2, there is illustrated a partial perspective view of the anti-polish ring 130. As illustrated in FIG. 2, the anti-polish ring 130 includes a ring portion 132 that extends axially along an axial portion of cylinder liner 104 between a first end 134 and an opposite second end 136 of ring portion 132. Ring portion 132 includes an inner radial surface 138 extending circumferentially around inner side of the ring portion 132 and having a first diameter. Ring portion 132 includes an outer radial surface 140 extending circumferentially around the outer side of ring portion 132 and having a second diameter that is greater than the first diameter. It should be understood that the outer radial surface and the inner radial surface of the anti-polish ring 130 face inwardly and outwardly relative to a positioning of the anti-polish ring 130 in the engine assembly 100. As assembled, for example, the outer radial surface 140 faces the cylinder liner 104 and the inner radial surface 138 faces the piston 106.

Ring portion 132 includes a circumferential lip 142 extending radially inwardly from inner radial surface 138 adjacent to first end 134 of ring portion 132. The lip 142 includes a radially inwardly facing surface 144 defined by an inner diameter 146. A flange 148 at second end 136 can be provided to support anti-polish ring 130 on the cylinder liner 106.

The lip 142 can be provided to assist in carbon scraping from upper portion 108 of piston 106 when the piston 106 moves in the upward and downward direction inside the cylinder liner 104. However, embodiments without a lip 142 are also contemplated. In these embodiments, the first diameter of the inner radial surface 138 would correspond to the inner diameter 146 to provide a scraping function.

The anti-polish ring 130 includes a passage 150 in inner diameter 146 that is configured to accommodate movement of one of the intake valve 110 or exhaust valve 112 therethrough, as shown in FIG. 3. The passage 150 is a recessed surface defined by a concave curvature in inner diameter 146, and extends in a circumferential direction around a portion of lip 142. Passage 150 extends from first end 134 towards second end 136 along the entire height of the lip 142 and/or the part of inner surface 138 having inner diameter 146 if there is no lip 142. It is further contemplated that a number of passages 150 can be provided that are distributed around the inner diameter 146 at each of the intake valve 110/exhaust valve 112 locations.

According to an aspect, the anti-polish ring 130 includes an alignment feature 152 to assist in aligning the anti-polish ring 130 on the cylinder head so that passages 150 are aligned with the intake and exhaust valve 110, 112 locations. In FIG. 4, the alignment feature 152 includes a notch 154 in flange 148 that is sized and shaped to receive a tab 164 of head gasket 160. Head gasket 160 is positioned in a predetermined orientation on head 116 via alignment dowels 162, and the tab 164 prevents rotation of anti-polish ring 130. Providing the tab 164 on the head gasket 160 does not require any modification to the block, and gasket 160 can be readily modified from a standard gasket to provide tab 164. In addition, the tab 164 is visible during assembly so that proper installation of anti-polish ring 130 can be readily confirmed. The tab 164 and notch 154 can include any suitable shape, including interfittable rectangular shapes as shown, matching semi-circular shapes, and other suitable shapes that assist in alignment.

Figure 5:
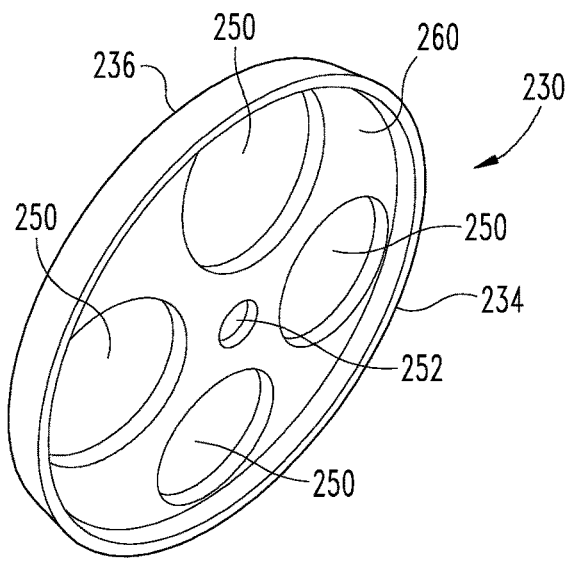
FIG. 5 is a perspective view of another embodiment of an anti-polish ring.
Figure 6:
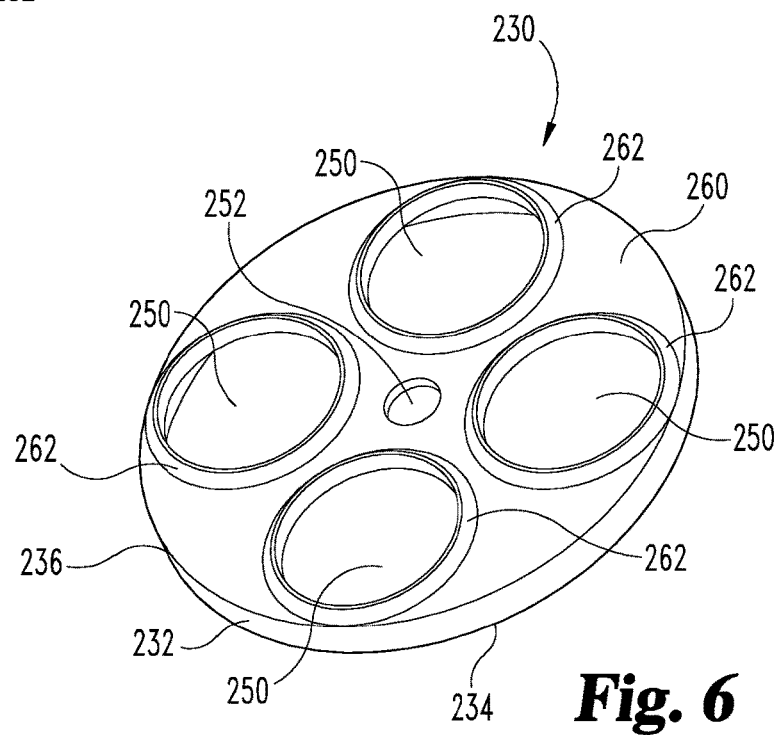
FIG. 6 is another perspective view of the anti-polish ring of FIG. 5.

With reference to FIGS. 5-6, there are illustrated perspective views of another embodiment scraper ring 230 that can be provided in the engine assembly 100. The scraper ring 230 may include a number of features and aspects which are the same as or similar to the features of the scraper ring 130. Scraper ring 230 also differs from scraper ring 130 in certain respects, for example, a heat shield 260 is provided across second end 236 of ring portion 232, when first end 234 is located toward the cylinder for carbon scraping. It shall therefore be appreciated that, except where differences are indicated, the description of scraper ring 130 is understood to apply to scraper ring 230 and vice versa.

Heat shield 260 faces the combustion event in the cylinder 102 and provides temperature protection to the cylinder head 116, shielding the cylinder head 116 from the flame front and reducing the potential for cracking. Cylinder head durability is improved along with a reduction in heat transfer from the engine to the head. Heat shield 260 includes a plate-like body with a number of passages 250 therein that accommodate movement of the intake and exhaust valves 110, 112 therethrough. Heat shield 260 also includes a central hole 252 to accommodate fuel injector 254.

Heat shield 260 also includes alignment features in the form of protrusions 262 around each of the passages 250. Protrusions 262 project axially from heat shield 260 toward the cylinder head 116 for receipt in valve pockets in cylinder head 116 to ensure proper orientation and assembly of anti-polish ring 230 in the cylinder liner 104.

Figure 7:
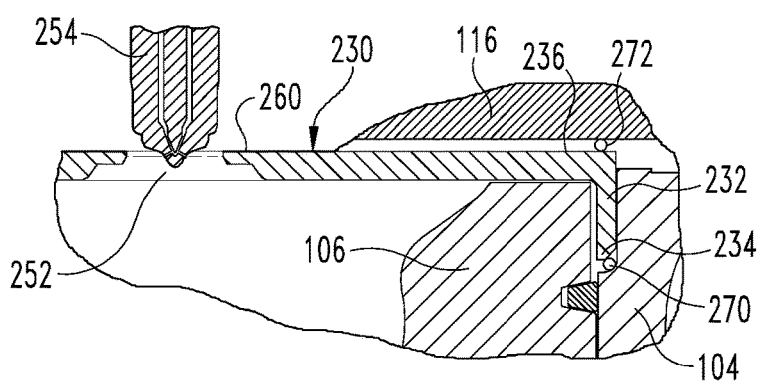
FIG. 7 is a sectional view of the anti-polish ring of FIG. 5 positioned in a cylinder liner with seating members to provide seating against the cylinder head.

Referring to FIG. 7, there is shown an assembly of anti-polish ring 230 in the cylinder liner 104 with seating members 270, 272 to provide seating against the cylinder head 116. Heat shield 260 is provided with a clearance with cylinder head 116 to prevent moving the cylinder head load path for the bolts from the head gasket 160 to the heat shield 260. However, to prevent heat shield 260 from resting on liner 104 and creating a substantial gap between the heat shield 260 and the cylinder head 116, compliant support members are provided. In the illustrated embodiment, the assembly includes a first seating member 270 located between first end 234 of ring portion 232 and the cylinder liner 104 in the liner counterbore. The assembly may also include a second seating member 272 between second end 236 of ring portion 232 and the cylinder head 116. The seating members 270 and/or 272 provide one or more compliant members to seat the heat shield 260 against the cylinder head 116. The second seating member 272 may eliminate the need for a cylinder head gasket combustion seal. In one embodiment, the seating members 270, 272 are low carbon steel wire rings.

Various aspects and embodiments of the present disclosure are contemplated. It is contemplated that one or more aspects and/or embodiments may be combined with one or more other aspects and/or embodiments.

According to one aspect, an apparatus includes an anti-polish ring configured to be inserted into and retained in a first end of a cylinder liner of a reciprocating piston internal combustion engine. The anti-polish ring includes a ring portion extending axially along an axial portion of the cylinder liner between a first end of the ring portion and a second end of the ring portion. The anti-polish ring also includes at least one passage configured to receive a corresponding exhaust valve or intake valve passing therethrough.

In an embodiment, the at least one passage is located at the second end of the ring portion. In an embodiment, the anti-polish ring includes a heat shield at the second end of the ring portion. In an embodiment, the at least one passage includes a circular bore through the heat shield. In an embodiment, the at least one passage includes four passages formed by circular bores through the heat shield.

In an embodiment, the at least one passage is formed by a recess in an inner diameter of the ring portion. In an embodiment, the recess is concavely curved in a circumferential direction along the inner diameter. In an embodiment, the recess extends from the first end of the ring portion toward the second end of the ring portion. In an embodiment, the at least one passage includes four passages spaced about the inner diameter of the ring portion each formed by a corresponding recess in the inner diameter of the ring portion.

In an embodiment, anti-polish ring includes at least one alignment feature for interacting with one of a cylinder head or a head gasket to align the anti-polish ring in the cylinder liner. In an embodiment, the at least one alignment feature includes a notch in the ring portion that receives a tab extending from the head gasket. In an embodiment, the at least one alignment feature includes a protrusion extending axially from the anti-polish ring that is received in a pocket of the cylinder head.

In an embodiment, the ring portion includes a circumferential lip extending radially inwardly from an inner diameter of the ring portion at a first end of the ring portion and the at least one passage is located on the lip.

According to another aspect, an apparatus includes an anti-polish ring configured to be inserted into a first end of a cylinder liner of a reciprocating piston internal combustion engine. The anti-polish ring includes a ring portion extending axially along an axial portion of the cylinder liner between a first end of the ring portion and a second end of the ring portion. The anti-polish ring includes a heat shield extending across the second end of the ring portion.

In an embodiment, the heat shield includes a number of passages for receiving movement of intake and exhaust valves therethrough. In an embodiment, the heat shield includes a hole for receiving a fuel injector. In an embodiment, each of the number of passages includes a protrusion extending axially therefrom that is received in a bore of the cylinder head to align the anti-polish ring in the cylinder liner.

In an embodiment, at least one seating member for seating the anti-polish ring against the cylinder head is provided. In an embodiment, the at least one seating member includes a wire ring between the cylinder liner and the first end of the ring portion. In an embodiment, the at least one seating member includes a second wire ring between the second end of the ring portion and the cylinder head.

According to another aspect of the present disclosure, an apparatus includes a gasket configured for placement on an engine block between the engine block and the head. The gasket includes an opening for aligning with a cylinder in the block and at least one feature for interfacing with an anti-polish ring to align the anti-polish ring in the cylinder.

While illustrative embodiments and implementations of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
    an anti-polish ring configured to be inserted into and retained in a first end of a cylinder liner of a reciprocating piston internal combustion engine, the anti-polish ring including a ring portion extending axially along an axial portion of the cylinder liner between a first end of the ring portion and a second end of the ring portion, wherein the anti-polish ring includes at least one passage configured to receive a corresponding exhaust valve or intake valve passing therethrough, wherein the at least one passage is formed on a portion of the second end of the ring portion that extends radially inward from the cylinder liner.

2. The apparatus of claim 1, wherein the anti-polish ring includes a heat shield at the second end of the ring portion.

3. The apparatus of claim 2, wherein the at least one passage includes a circular bore through the heat shield.

4. The apparatus of claim 3, wherein the at least one passage includes four passages formed by circular bores through the heat shield.

5. The apparatus of claim 1, wherein the at least one passage is formed by a recess in an inner diameter of the ring portion.

6. The apparatus of claim 5, wherein the recess is concavely curved in a circumferential direction along the inner diameter.

7. The apparatus of claim 6, wherein the recess extends from the first end of the ring portion toward the second end of the ring portion.

8. The apparatus of claim 5, wherein the at least one passage includes four passages spaced about the inner diameter of the ring portion each formed by a corresponding recess in the inner diameter of the ring portion.

9. The apparatus of claim 1, wherein the anti-polish ring includes at least one alignment feature for interacting with one of a cylinder head or a head gasket to align the anti-polish ring in the cylinder liner and the at least one alignment feature includes a notch in the ring portion that receives a tab extending from the head gasket.

10. The apparatus of claim 1, wherein the anti-polish ring includes at least one alignment feature for interacting with one of a cylinder head or a head gasket to align the anti-polish ring in the cylinder liner and the at least one alignment feature includes a protrusion extending axially from the anti-polish ring that is received in a pocket of the cylinder head.

11. The apparatus of claim 1, wherein the portion of the second end of the ring portion is a circumferential lip extending radially inwardly from an inner diameter of the ring portion at the second end of the ring portion and the at least one passage is located on the lip.

12. An apparatus comprising:
an anti-polish ring configured to be inserted into a first end of a cylinder liner of a reciprocating piston internal combustion engine, the anti-polish ring including a ring portion extending axially along an axial portion of the cylinder liner between a first end of the ring portion and a second end of the ring portion, wherein the anti-polish ring includes a heat shield that extends radially inward from the cylinder liner across the second end of the ring portion.

13. The apparatus of claim 12, wherein the heat shield includes a number of passages for receiving movement of intake and exhaust valves therethrough.

14. The apparatus of claim 13, wherein the heat shield includes a hole for receiving a fuel injector.

15. The apparatus of claim 13, wherein each of the number of passages includes a protrusion extending axially therefrom that is received in a bore of the cylinder head to align the anti-polish ring in the cylinder liner.

16. The apparatus of claim 12, further comprising at least one seating member for seating the anti-polish ring against the cylinder head.

17. The apparatus of claim 16, wherein the at least one seating member includes a wire ring between the cylinder liner and the first end of the ring portion.

18. The apparatus of claim 17, wherein the at least one seating member includes a second wire ring between the second end of the ring portion and the cylinder head.

19. An apparatus, comprising:
a gasket configured for placement on an engine block between the engine block and a cylinder head, the gasket including an opening for aligning with a cylinder in the block and the gasket including at least one feature for interfacing with an alignment feature provided on an anti-polish ring to align the anti-polish ring in the cylinder and prevent rotation of the anti-polish ring.

\* \* \* \* \*